United States Patent
Iuliano et al.

(10) Patent No.: US 11,656,908 B2
(45) Date of Patent: May 23, 2023

(54) ALLOCATION OF MEMORY RESOURCES TO SIMD WORKGROUPS

(71) Applicant: Imagination Technologies Limited, Kings Langley (GB)

(72) Inventors: Luca Iuliano, Chesham (GB); Simon Nield, Wendover (GB); Yoong-Chert Foo, London (GB); Ollie Mower, Harrow (GB); Jonathan Redshaw, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/220,849

(22) Filed: Apr. 1, 2021

(65) Prior Publication Data

US 2021/0224123 A1 Jul. 22, 2021

Related U.S. Application Data

(63) Continuation of application No. 16/132,703, filed on Sep. 17, 2018, now Pat. No. 10,990,448.

(30) Foreign Application Priority Data

Sep. 15, 2017 (GB) .................................... 1714922

(51) Int. Cl.
*G06F 9/50* (2006.01)
*G06F 12/084* (2016.01)
(Continued)

(52) U.S. Cl.
CPC .......... *G06F 9/5016* (2013.01); *G06F 9/4881* (2013.01); *G06F 9/505* (2013.01);
(Continued)

(58) Field of Classification Search
CPC ............... G06F 12/0223; G06F 12/084; G06F 12/0842; G06F 9/5016; G06F 9/4881; G06F 9/5022; G06F 9/505; G06F 3/544
See application file for complete search history.

(56) References Cited

U.S. PATENT DOCUMENTS 6,950,107 B1 9/2005 Moreton et al.
6,996,663 B1 * 2/2006 Marsteiner .......... H04L 45/7453
711/108

(Continued)

OTHER PUBLICATIONS

Huang et al., "XMalloc: A Scalable Lock-free Dynamic Memory Allocator for Many-core Machines," 10th IEEE International Conference on Computer and Information Technology, pp. 1134-1139 (2010).

(Continued)

*Primary Examiner* — Tracy A Warren
(74) *Attorney, Agent, or Firm* — Potomac Law Group, PLLC; Vincent M DeLuca

(57) ABSTRACT

A memory subsystem for use with a single-instruction multiple-data (SIMD) processor comprising a plurality of processing units configured for processing one or more workgroups each comprising a plurality of SIMD tasks, the memory subsystem comprising: a shared memory partitioned into a plurality of memory portions for allocation to tasks that are to be processed by the processor; and a resource allocator configured to, in response to receiving a memory resource request for first memory resources in respect of a first-received task of a workgroup, allocate to the workgroup a block of memory portions sufficient in size for each task of the workgroup to receive memory resources in the block equivalent to the first memory resources.

20 Claims, 6 Drawing Sheets

(51) Int. Cl.

| | | |
|---|---|---|
| *G06F 12/02* | (2006.01) | |
| *G06F 12/0842* | (2016.01) | |
| *G06F 9/48* | (2006.01) | |
| *G06F 9/54* | (2006.01) | |
| *G06F 12/00* | (2006.01) | |

(52) U.S. Cl.
CPC ............ *G06F 9/5022* (2013.01); *G06F 9/544* (2013.01); *G06F 12/0223* (2013.01); *G06F 12/084* (2013.01); *G06F 12/0842* (2013.01); *G06F 12/00* (2013.01); *G06F 12/02* (2013.01)

(56) References Cited

U.S. PATENT DOCUMENTS

| | | |
|---|---|---|
| 7,761,697 B1 | 7/2010 | Coon et al. |
| 2004/0160449 A1 | 8/2004 | Gossalia et al. |
| 2011/0022817 A1 | 1/2011 | Gaster et al. |
| 2011/0055511 A1 | 3/2011 | Mantor et al. |
| 2011/0087840 A1 | 4/2011 | Glasco et al. |
| 2014/0281366 A1 | 9/2014 | Felch |
| 2014/0310484 A1* | 10/2014 | Giroux .................. G06F 12/109 |
| | | 711/170 |
| 2017/0192901 A1 | 7/2017 | Coffin et al. |

OTHER PUBLICATIONS

Steinberger et al., "Scatter Alloc: Massively Parallel Dynamic Memory Allocation for the GPU," 2012 Innovative Parallel Computing (InPar), May 2012.

Yang et al., "Shared Memory Multiplexing: A Novel Way to Improve GPGPU Throughput," 2012 21st International Conference on Parallel Architectures and Compilation Techniques (PACT), Sep. 2012.

Huang et al., "Scalable SIMD-Parallel Memory Allocation for Many-Core Machines," Journal of Supercomputing, vol. 64, No. 3, Sep. 2011; pp. 1008-1020.

(Note: copies of NPL in parent application).

* cited by examiner

ALLOCATION OF MEMORY RESOURCES TO SIMD WORKGROUPS

CROSS-REFERENCE TO RELATED APPLICATIONS AND CLAIM OF PRIORITY

This application is a continuation under 35 U.S.C. 120 of copending application Ser. No. 16/132,703 filed Sep. 17, 2018, which claims foreign priority under 35 U.S.C. 119 from United Kingdom Application No. 1714922.0 filed Sep. 15, 2017.

BACKGROUND

The present disclosure relates to memory subsystems for use with a plurality of processing units.

In systems comprising a plurality of processing units, a shared memory is often provided that can be accessed by at least some of the processing units. Because of the range of processing tasks that might be run at the processing units, each having varying memory requirements, shared memory resources are not typically fixed at design time for each processing unit. An allocation mechanism is typically provided to allow processing tasks running on the different processing units to each request one or more areas of the shared memory. This enables the shared memory to be dynamically assigned for use by the tasks being performed at the processing units.

Efficient use of a shared memory can be achieved through careful design of the allocation mechanism.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a memory subsystem for use with a single-instruction multiple-data (SIMD) processor comprising a plurality of processing units configured for processing one or more workgroups each comprising a plurality of SIMD tasks, the memory subsystem comprising:
  a shared memory partitioned into a plurality of memory portions for allocation to tasks that are to be processed by the processor; and
  a resource allocator configured to, in response to receiving a memory resource request for first memory resources in respect of a first-received task of a workgroup, allocate to the workgroup a block of memory portions sufficient in size for each task of the workgroup to receive memory resources in the block equivalent to the first memory resources.

The resource allocator may be configured to allocate the block as a contiguous block of memory portions.

The resource allocator may be configured to, on servicing the first-received task of the workgroup, allocate to that task the requested first memory resources from the block and reserve the remaining memory portions of the block so as to prevent allocation to tasks of other workgroups.

The resource allocator may be configured to, in response to subsequently receiving a memory resource request in respect of a second task of the workgroup, allocate memory resources of the block to that second task.

The resource allocator may be arranged to receive memory resource requests from a plurality of different requestors and to, in response to allocating the block of memory portions to the workgroup, preferentially service memory requests received from the requestor from which the first-received task of that workgroup was received.

The resource allocator may be further configured to, in response to receiving an indication that processing of a task of the workgroup has completed, deallocate the memory resources allocated to that task without waiting for processing of the workgroup to complete.

The shared memory may be further partitioned into a plurality of non-overlapping windows each comprising a plurality of memory portions and the resource allocator is configured to maintain a window pointer indicating a current window in which allocation of memory portions will be attempted in response to a next-received memory request.

The resource allocator may be embodied in a binary logic circuit and the window length is such that the availability of all of the memory portions of each window can be checked in a single clock cycle of the binary logic circuit.

The resource allocator may be further configured to maintain a fine status array arranged to indicate whether each memory portion of the shared memory is allocated to a task.

The resource allocator may be configured to, in response to receiving the memory resource request in respect of the first-received task of the workgroup, search the current window for a contiguous block of memory portions which are indicated by the fine status array as being available for allocation, the resource allocator being configured to, if such a contiguous block is identified in the current window, allocate that contiguous block to the workgroup.

The resource allocator may be configured to allocate the contiguous block of memory portions such that the block starts at the lowest possible position in the window.

The resource allocator may be further configured to maintain a coarse status array arranged to indicate, for each window of the shared memory, whether all the memory portions of the window are unallocated, the resource allocator being configured to, in parallel with searching the current window for a contiguous block of memory portions, check the coarse status array to determine whether the size of the requested block can be accommodated by one or more subsequent windows; the resource allocator being configured to, if both a sufficiently large contiguous block cannot be identified in the current window and the requested block can be accommodated by one or more subsequent windows, allocate the block to the workgroup comprising memory portions starting at the first memory portion of the current window in a contiguous block with the subsequent window(s) and extending into those subsequent window(s).

The resource allocator may be further configured to, in parallel with searching the current window, form an overflow metric representing the memory resources of the required block of memory portions which cannot be accommodated in the current window starting at the first memory portion of the current window in a contiguous block of unallocated memory portions immediately adjacent to the subsequent window, the resource allocator being configured to, if both a sufficiently large contiguous block cannot be identified in the current window and the requested block cannot be accommodated by one or more subsequent windows, subsequently attempt allocation of a block to the workgroup by searching the subsequent window, starting at the first memory portion of the subsequent window, for a contiguous block of unallocated memory portions sufficient in total size to accommodate the overflow metric.

The fine status array may be an array of bits in which each bit corresponds to one memory portion of the shared memory and the value of each bit indicates whether the corresponding memory portion is unallocated or not The coarse status array may be an array of bits in which each bit corresponds to one window of the shared memory and the value of each bit indicates whether the respective window is entirely unallocated or not.

The resource allocator may be configured to form each bit of the coarse status array by performing an OR reduction of all of the bits of the fine status array which correspond to memory portions lying in the window corresponding to that bit of the coarse status array.

The window length may be a power of two.

The resource allocator may maintain a data structure identifying which of the one or more workgroups are currently allocated a block of memory portions.

According to a second aspect there is provided a method of allocating shared memory resources to tasks for execution in a single-instruction multiple-data (SIMD) processor comprising a plurality of processing units each configured for processing one or more workgroups each comprising a plurality of SIMD tasks, the method comprising:
  receiving a shared memory resource request for first memory resources in respect of a first-received task of a workgroup; and
  allocating to the workgroup a block of memory portions of a shared memory sufficient in size for each task of the workgroup to receive memory resources in the block equivalent to the first memory resources.

Allocating to the workgroup a block of memory portions may comprise allocating the block as a contiguous block of memory portions.

The method may further comprise, on servicing the first-received task of the workgroup, allocating to that task the requested first memory resources from the block and reserve the remaining memory portions of the block so as to prevent allocation to tasks of other workgroups.

The method may further comprise, in response to subsequently receiving a memory resource request in respect of a second task of the workgroup, allocating memory resources of the block to that second task.

The method may further comprise receiving memory resource requests from a plurality of different requestors and to, in response to allocating the block of memory portions to the workgroup, preferentially servicing memory requests received from the requestor from which the first-received task of that workgroup was received.

The method may further comprise, in response to receiving an indication that processing of a task of the workgroup has completed, deallocating the memory resources allocated to that task without waiting for processing of the workgroup to complete.

The method may further comprise maintaining a fine status array arranged to indicate whether each memory portion of the shared memory is allocated to a task.

Allocating to the workgroup a block of memory portions may comprise searching the current window for a contiguous block of memory portions which are indicated by the fine status array as being available for allocation and, if such a contiguous block is identified in the current window, allocating that contiguous block to the workgroup.

Allocating the contiguous block to the workgroup may comprise allocating the contiguous block of memory portions such that the contiguous block starts at the lowest possible position in the window.

The method may further comprise:
  maintaining a coarse status array arranged to indicate, for each window of the shared memory, whether all the memory portions of the window are unallocated;
  in parallel with searching the current window for a contiguous block of memory portions, checking the coarse status array to determine whether the size of the requested block can be accommodated by one or more subsequent windows; and
  if both a sufficiently large contiguous block cannot be identified in the current window and the requested block can be accommodated by one or more subsequent windows, allocating the block to the workgroup comprising memory portions starting at the first memory portion of the current window in a contiguous block with the subsequent window(s) and extending into those subsequent window(s).

The method may further comprise:
  in parallel with searching the current window, forming an overflow metric representing the memory resources of the required block of memory portions which cannot be accommodated in the current window starting at the first memory portion of the current window in a contiguous block of unallocated memory portions immediately adjacent to the subsequent window; and
  if both a sufficiently large contiguous block cannot be identified in the current window and the requested block cannot be accommodated by one or more subsequent windows, subsequently attempting allocation of a block to the workgroup by searching the subsequent window, starting at the first memory portion of the subsequent window, for a contiguous block of unallocated memory portions sufficient in total size to accommodate the overflow metric.

According to a third aspect there is provided a memory subsystem for use with a single-instruction multiple-data (SIMD) processor comprising a plurality of processing units for processing SIMD tasks, the memory subsystem comprising:
  a shared memory partitioned into a plurality of memory portions for allocation to tasks that are to be processed by the processor;
  a translation unit configured to associate tasks with one or more physical addresses of the shared memory; and
  a resource allocator configured to, in response to receiving a memory resource request for first memory resources in respect of a task, allocate to the task a contiguous virtual memory block and cause the translation unit to associate the task with a plurality of physical addresses of memory portions each corresponding to a region of the virtual memory block, said memory portions collectively embodying the complete virtual memory block.

At least some of the plurality of memory portions of the block may not be contiguous in the shared memory.

The virtual memory block may comprise a base address which is the physical address of one of the memory portions associated with the task.

The virtual memory block may comprise a base address which is a logical address of the virtual memory block.

The translation unit may be operable to subsequently service an access request received from the task in respect of the virtual memory block, the access request including an identifier of the task and an offset of an area of memory within the virtual memory block, the translation unit being configured to service the access request at the memory portion corresponding to the region of the virtual memory block indicated by the offset.

The translation unit may comprise a content addressable memory configured to return one or more corresponding physical addresses in response to receiving an identifier of the item and an offset within the virtual memory block.

The SIMD processor may be configured for processing a workgroup comprising a plurality of tasks, the task is the first-received task of a workgroup, and the resource allocator is configured to reserve for the workgroup sufficient memory portions for each task of the workgroup to receive memory resources equivalent to the first memory resources and to allocate to the first-received task the requested memory resources from the memory portions reserved for the workgroup.

The resource allocator may be configured to allocate each task of the workgroup a virtual memory block such that the virtual memory blocks allocated to the tasks of the workgroup collectively represent a contiguous superblock of virtual memory blocks.

The resource allocator may be configured to, in response to subsequently receiving a memory resource request in respect of a second task of the workgroup, allocate a contiguous virtual memory block from the superblock to the second task.

According to a fourth aspect there is provided a method of allocating shared memory resources to tasks for execution in a single-instruction multiple-data (SIMD) processor comprising a plurality of processing units each configured for processing SIMD tasks, the method comprising:
    receiving a memory resource request for first memory resources in respect of a task;
    allocating to the task a contiguous virtual memory block; and
    associating the task with a plurality of physical addresses of memory portions of a shared memory, each corresponding to a region of the virtual memory block, said memory portions collectively embodying the complete virtual memory block.

The method may further comprise:
    subsequently receiving an access request received from the task in respect of the virtual memory block, the access request including an identifier of the task and an offset of an area of memory within the virtual memory block; and
    servicing the access request by accessing the memory portion corresponding to the region of the virtual memory block indicated by the offset.

The tasks may be grouped together in workgroups for execution at the SIMD processor, the task may be the first-received task of a workgroup, and the allocating to the task a contiguous virtual memory block may comprise:
    reserving for the workgroup sufficient memory portions for each task of the workgroup to receive memory resources equivalent to the first memory resources; and
    allocating to the first-received task the requested memory resources from the memory portions reserved for the workgroup.

The reserving for the workgroup may comprise reserving each task of the workgroup a virtual memory block such that the virtual memory blocks allocated to the tasks of the workgroup collectively represent a contiguous superblock of virtual memory blocks.

The method may further comprise, in response to subsequently receiving a memory resource request in respect of a second task of the workgroup, allocating a contiguous virtual memory block from the superblock to the second task.

The memory subsystem may be embodied in hardware on an integrated circuit.

There is provided a method of manufacturing, using an integrated circuit manufacturing system, a memory subsystem as described herein.

There is provided a method of manufacturing, using an integrated circuit manufacturing system, a memory subsystem as described herein, the method comprising:
    processing, using a layout processing system, a computer readable description of the graphics processing system so as to generate a circuit layout description of an integrated circuit embodying the graphics processing system; and
    manufacturing, using an integrated circuit generation system, the graphics processing system according to the circuit layout description.

There is provided an integrated circuit definition dataset that, when processed in an integrated circuit manufacturing system, configures the system to manufacture a memory subsystem as described herein.

There is provided a non-transitory computer readable storage medium having stored thereon a computer readable description of an integrated circuit that, when processed in an integrated circuit manufacturing system, causes the integrated circuit manufacturing system to manufacture a memory subsystem as described herein.

There is provided a non-transitory computer readable storage medium having stored thereon a computer readable description of a memory subsystem as described herein which, when processed in an integrated circuit manufacturing system, causes the integrated circuit manufacturing system to:
    process, using a layout processing system, the computer readable description of the graphics processing system so as to generate a circuit layout description of an integrated circuit embodying the graphics processing system; and
    manufacture, using an integrated circuit generation system, the graphics processing system according to the circuit layout description.

There is provided an integrated circuit manufacturing system configured to manufacture a memory subsystem as described herein.

There is provided an integrated circuit manufacturing system comprising:
    a non-transitory computer readable storage medium having stored thereon a computer readable integrated circuit description that describes a memory subsystem as described herein;
    a layout processing system configured to process the integrated circuit description so as to generate a circuit layout description of an integrated circuit embodying the memory subsystem; and
    an integrated circuit generation system configured to manufacture the memory subsystem according to the circuit layout description.

There is provided a memory subsystem configured to perform a method as described herein. There is provided computer program code for performing a method as described herein. There is provided a non-transitory computer readable storage medium having stored thereon computer readable instructions that, when executed at a computer system, cause the computer system to perform a method as described herein.

BRIEF DESCRIPTION OF THE DRAWINGS

The present invention is described by way of example with reference to the accompanying drawings. In the drawings.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The term 'task' is used herein to refer to a group of data-items and the work that is to be performed upon those data-items. For example, a task may comprise or be associated with a program or reference to a program (e.g. the same sequence of ALU instructions or reference thereto) in addition to a set of data that is to be processed according to the program, where this set of data may comprise one or more data elements (or data-items, e.g. a plurality of pixels or vertices).

The term 'program instance' is used herein to refer to individual instances that take a path through the code. A program instance therefore refers to a single data-item and a reference (e.g. pointer) to a program which will be executed on the data-item. A task therefore could be considered to comprise a plurality of program instances (e.g. up to 32 program instances), though in practice only a single instance of the common program (or reference) is required per task. Groups of tasks that share a common purpose, share local memory and may execute the same program (although they may execute different parts of that program) or compatible programs on different pieces of data may be linked by a group ID. A group of tasks with the same group ID may be referred to as a 'workgroup' (and hence the group ID may be referred to as the 'workgroup ID'). There is therefore a hierarchy of terminology, with tasks comprising a plurality of program instances and groups (or workgroups) comprising a plurality of tasks.

Some processing systems which provide a shared memory may comprise one or more SIMD (Single Instruction, Multiple Data) processors each configured to execute a workgroup of tasks in parallel. Each task of a workgroup may require an allocation of shared memory. Often however, there is some interdependency between the processing of tasks being executed at a SIMD processor. For example, for some workgroups a barrier synchronisation point is defined which all tasks must reach in order for processing of any one of the tasks to continue past the barrier synchronisation point and processing of the workgroup as a whole to complete. More than one barrier synchronisation point can sometimes be defined for a workgroup, with all tasks needing to reach a given barrier in order for processing of any of the tasks to continue beyond the barrier.

Figure 1:
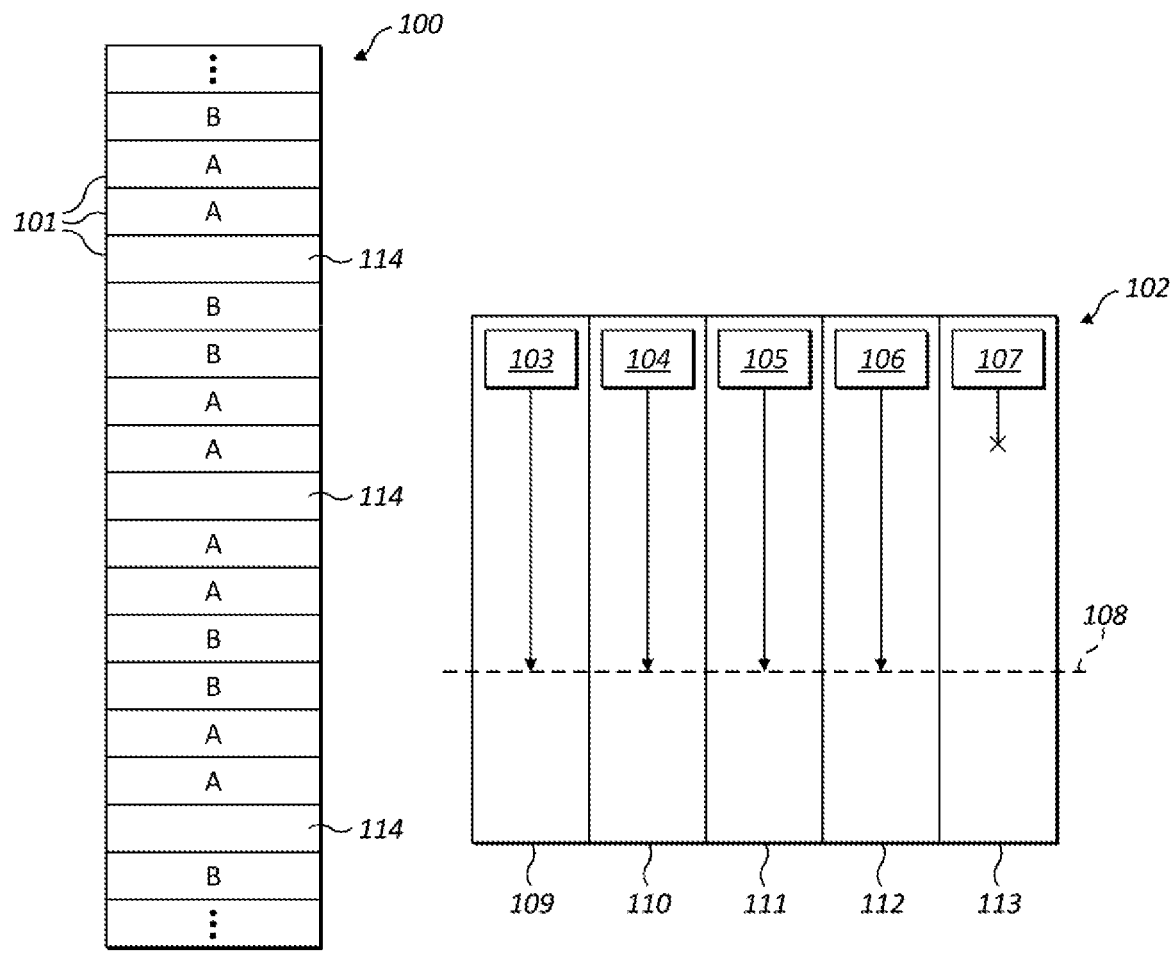
FIG. 1 illustrates conventional allocation of shared memory to tasks for execution at a SIMD processor.

With conventional allocation mechanisms for shared memories, the use of barrier synchronisation points can lead to processing deadlock for a workgroup. This is illustrated in a simple example in FIG. 1 which shows a shared memory 100 partitioned into a plurality of memory portions 101 and a SIMD processor 102 having five processing elements 109-113 configured to process in parallel a workgroup 'A' comprising five tasks 103-107. In this example, processing of only four of the tasks has started and all of these tasks have reached the barrier synchronisation point 108. This is because each of the tasks requires a contiguous block of two memory portions in shared memory (marked with letter 'A') but, once the first four tasks had been allocated their blocks of shared memory, it was not possible to allocate a contiguous block of two memory portions to the fifth task. Memory portions belonging to a second workgroup are marked with the letter 'B'. Several memory portions 114 are available in the shared memory but these memory portions are fragmented and cannot provide a continuous block of memory. As a result deadlock ensued: processing of the four tasks 103-106 has stopped awaiting the fifth task 107 to reach the barrier synchronisation point 108, but processing of the fifth task 107 cannot be started because its request to be allocated shared memory cannot be serviced.

Such deadlocks can introduce substantial latency and are typically only resolved when processing of a deadlocked workgroup hits a predetermined timeout. Not only is the time spent waiting for the timeout to expire wasted, but so is the partial processing performed on the tasks which have reached the barrier synchronisation point—this processing will need to be repeated. Deadlock situations can be particularly problematic in systems comprising multiple SIMD processors all sharing a common memory since, in conditions when available shared memory is limited or when tasks require relatively large contiguous blocks of memory, more than one workgroup may be deadlocked at a time.

Fragmentation Avoidance

Figure 2:
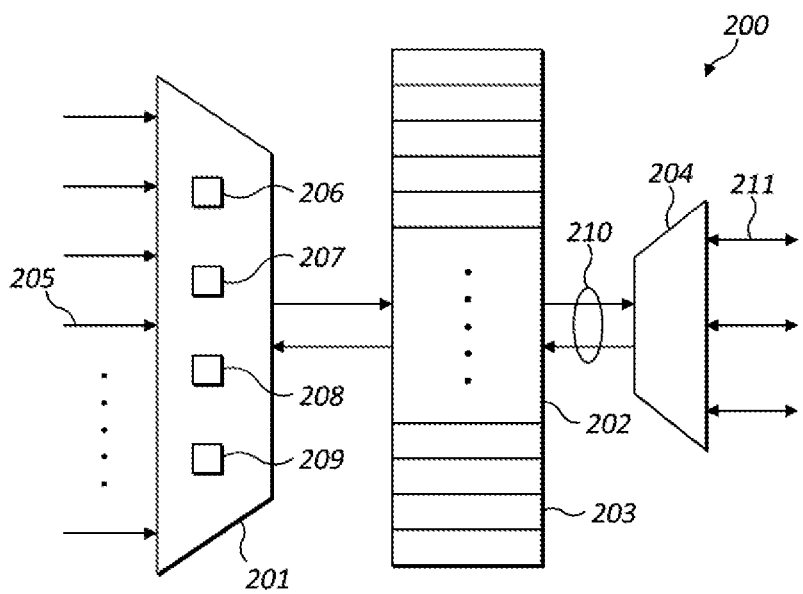
FIG. 2 is a schematic diagram of a first memory subsystem comprising a resource allocator configured according to principles described herein.

FIG. 2 is a schematic diagram showing a memory subsystem 200 configured to allocate shared memory in a manner which addresses the issues identified above. Memory subsystem 200 comprises a resource allocator 201 and shared memory 202 partitioned into a plurality of memory portions 203. The resource allocator may be configured to receive memory requests from a plurality of requestors 205—for example, each task running at a processing unit may be a requestor, each processing unit may be a requestor, or each type of processing unit may be a requestor. Different requestors may have different hardwired inputs to the resource allocator which the resource allocator is required to arbitrate between. The resource allocator may service memory requests from requestors on any suitable basis—for example, memory requests could be serviced on a simple round-robin basis or according to a set of arbitration rules for selecting the next requestor to be serviced. In other embodiments, memory requests from multiple requestors may be aggregated at a request queue into which memory allocation requests are received and from which the resource allocator may receive memory requests to service.

Allocated portions of the shared memory may be accessed by the processing units by means of input/output arbiter 204. The I/O arbiter 204 arbitrates access to the shared memory between a plurality of units (e.g. processing units or other units that are able to access the shared memory) which submit access requests (e.g. read/writes) over interface 211 (which may comprise one or more hardwired links between which the I/O arbiter arbitrates).

Figure 3:
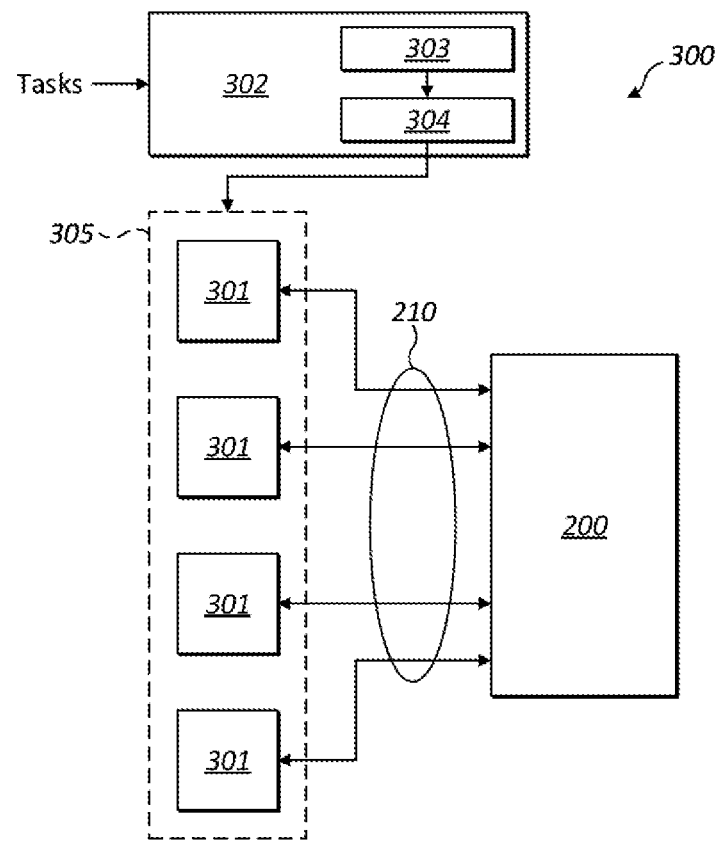
FIG. 3 illustrates the memory subsystem in context in a computer system having a plurality of processing cores.

FIG. 3 shows the memory subsystem 200 in context in a computer system 300 comprising a plurality of processing units 301 and a work scheduler 302 configured to schedule tasks it receives for processing at the processing units. One or more of the processing units may be SIMD processors. The computer system could be, for example, a graphics processing unit (GPU) and the processing units could comprise one or more units (which may each be a SIMD processor) for performing integer operations, floating point operations, complex arithmetic, texture address calculations, sampling operations, etc. The processing units may together form a set of parallel pipelines 305 with each processing unit representing one of the pipelines of the set. The computer system could in examples be a vector processor.

Each processing unit could comprise one or more arithmetic logic units (ALUs), and each SIMD processor may comprise one or more different types of ALUs, e.g. with each type of ALU being optimized for a particular type of computation. In examples where the processing units 301 are provided at a GPU, the processing block 104 may comprise a plurality of shader cores, with each shader core comprising one or more ALUs.

Work scheduler 302 may comprise a scheduler unit 303 and an instruction decoder 304, the scheduler unit being configured to perform the scheduling of tasks for execution at the processing units 301 and the instruction decoder being configured to decode the tasks into a form suitable for execution at the processing units 301. It will be appreciated that the particular decoding of the tasks performed by the instruction decoder will be determined by the type and configuration of the processing units 301.

The resource allocator 201 is operable to receive requests to allocate memory resources to tasks executing at the processing units 301 of the computer system. Each of the tasks or processing units could be a requestor 205. One or more of the processing units may be SIMD processors configured to execute a workgroup of tasks in parallel. Each task of a workgroup may request an allocation of memory from the resource allocator—depending on the particular architecture of the system, such a request could be made on behalf of the task (e.g. by a work scheduler on assigning the task to a parallel processor) or by the task itself.

In some architectures, tasks relating to various workgroups or for execution at different types of processing unit may be queued for processing at one or more common work queues such that tasks for processing in parallel as a workgroup are assigned over a period of time to the appropriate processing unit by work scheduler 302. Tasks relating to other workgroups and/or processing units may be interspersed with the tasks of a workgroup. A request to the resource allocator for memory resources would typically be made in respect of a task on that task being scheduled at a processor. The task may but need not make the request for memory resources itself. For example, in some architectures the work scheduler 302 might make requests for memory resources on behalf of the tasks it schedules at the processing units. Many other architectures are possible.

The resource allocator is configured to allocate memory resources to the entire workgroup on first receiving an allocation request in respect of a task of that workgroup. An allocation request typically indicates the size of the memory resources required—for example, a task might require a certain number of bytes or memory portions. Because a SIMD processor performs the same instructions in parallel on different source data, each task of a workgroup for execution at a SIMD processor has the same memory requirements. The resource allocator is configured to, in response to the first request it receives for memory in respect of a task of a workgroup, allocate a contiguous block of memory for the entire workgroup. The size of that block is at least N times the memory resources requested in that first request, where N is the number of tasks in the workgroup (e.g. 32). The number of tasks in a workgroup may be fixed for a given system and therefore known to the resource allocator in advance, the number of tasks in a workgroup may be provided to the resource allocator with the first request for memory resources, and/or the number of tasks in a workgroup may be otherwise available to the resource allocator (e.g. as a parameter maintained at a data store accessible to the resource allocator).

If there is sufficient contiguous space in the shared memory for the entire block of the workflow, the resource allocator is configured to respond to the first-received request for memory resources for a task of a workflow with the memory resources requested by that task. This allows processing of that first task of the workgroup to commence. The resource allocator further reserves the remainder of the block of shared memory which is to be allocated to the other tasks of the workgroup so as to prevent allocation of the block to tasks of other workgroups. If there is not sufficient contiguous space in the shared memory for the entire block of the workflow, the first-received memory request is rejected. This approach ensures that once a first task of a workgroup does receive an allocation of memory, the system can guarantee that all the tasks of the workgroup will receive their allocation of memory. This avoids the deadlock scenario described above.

Figure 4:
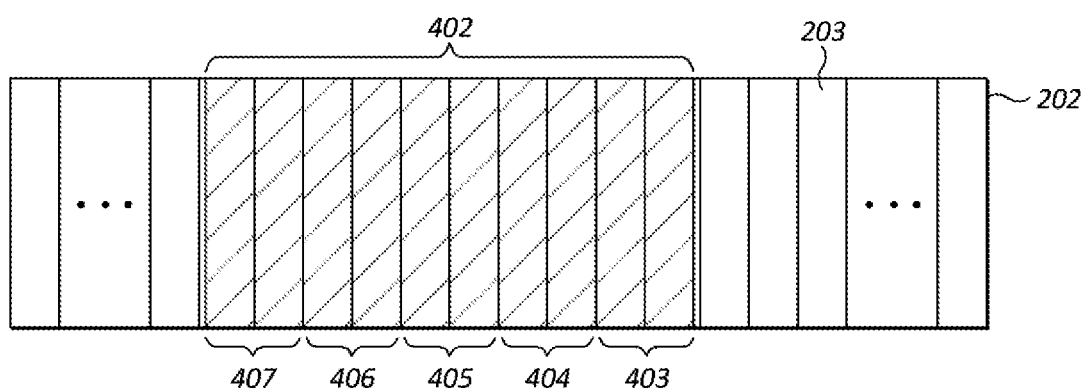
FIG. 4 shows a shared memory comprising a block allocated in slices to tasks of a workgroup.

When the resource allocator receives requests for memory resources for subsequently-received tasks of the same workgroup, the resource allocator allocates the required resources to those tasks from the reserved block. The resource allocator may sequentially allocate adjacent "slices" of the reserved block of shared memory to the tasks in the order their respective memory requests are received, with the first-received task receiving the first slice of the block. This is illustrated in FIG. 4 which shows a shared memory 202 comprising a plurality of memory portions 203 and a block 402 reserved for a workgroup following the reception of a first memory request for a task of that workgroup. In this example, each slice comprises two memory portions. The first slice 403 of the block is allocated to that first task and the subsequent slices of the block are reserved in the shared memory such that when the next memory request is received for a task of the workgroup, the next slice 404 is allocated, and so on, until all the slices 403-407 of the block are allocated to the tasks and the workgroup can be processed to completion.

Where the tasks of a workgroup have an expected or predefined order, the resource allocator could alternatively allocate memory slices of a reserved memory block to the tasks of the workgroup according to that order. In some architectures, memory requests for tasks may be received out of order. For example, task number three of five may be allocated the third slice of the block even if a memory request is received for the third task before a memory request for the second task. In this manner, each task of a workgroup may be allocated a predetermined slice of a block reserved for the workgroup. Since the first-received task may not be the first task of a workgroup, the first task need not be allocated the first slice of the block reserved for the workgroup.

In some architectures it is possible for tasks to make further requests for memory during processing. Such memory requests may be handled in the same manner as the initial requests for memory, with a block being allocated for all the tasks of the workgroup when the first request is received in respect of the workgroup on the basis that each task for processing at a SIMD processor will require the same memory resources. The allocated block size would be at least N times the memory resources requested in that first request, where N is the number of task in the workgroup.

Once a task has been scheduled at a processing unit, the task may access its allocated memory resources (e.g. by performing reads and/or writes) at the shared memory 202 as indicated by data path 210.

The resource allocator may be configured to deallocate the slice of shared memory allocated to each task as soon as processing of that task completes at the processing unit (i.e. without waiting for the entire workgroup to complete). This ensures that memory portions which are no longer required are released as soon as possible for use by other tasks. For example, the release of a final "slice" might create a subsequent contiguous block sufficiently sized for allocation to a subsequently processed workgroup.

Figure 5:
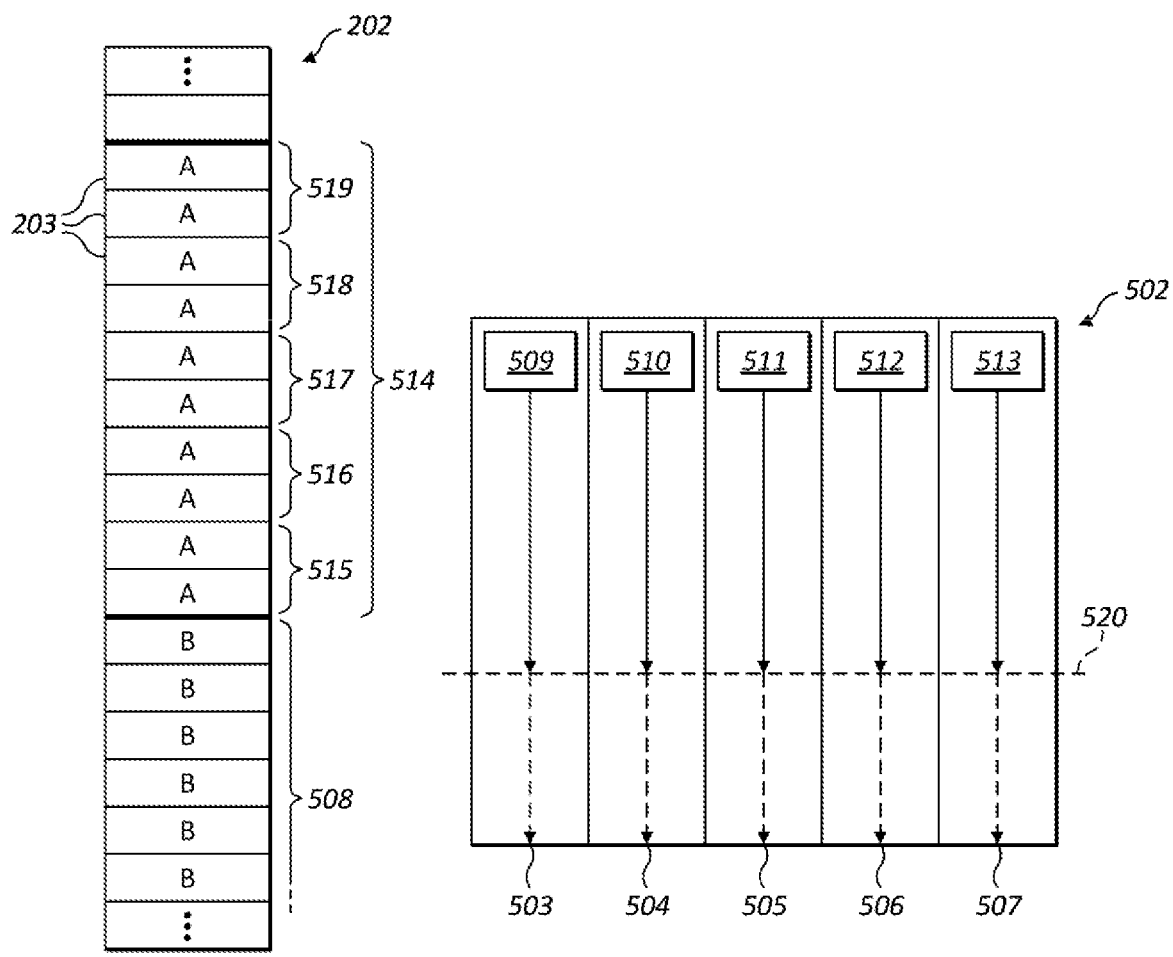
FIG. 5 illustrates allocation of shared memory by the resource allocator to tasks for execution as a workgroup at a SIMD processor.

FIG. 5 illustrates the allocation of shared memory to tasks according to the principles described herein. Shared memory 202 is shown portioned into a plurality of memory portions 203 along with a SIMD processor 502 having five processing elements 503-507. For contrast with the conventional approach to shared memory allocation, this arrangement corresponds to the arrangement shown in FIG. 1. The shared memory comprises an existing block of memory portions 508 allocated to a workgroup B (the respective memory portions are marked 'B' in the figure). Consider the point at which a first memory request is received in respect of a task 509 of a second workgroup A. On receiving a memory request for task 509 a block 514 of memory portions (marked 'A') is allocated to the shared memory as shown in the figure. Thus, as described above, the allocation of the block of memory portions for the whole workgroup is performed in response to receiving the first request for memory in respect of the tasks of the workgroup. A slice 515 of two memory portions of the block 514 is allocated to the first task. Slices 516-519 of the block are reserved for the other tasks of workgroup A.

As memory requests for the subsequent tasks 510-513 are received, each can be serviced by allocating one of the reserved slices 516-519 to the respective task and the task scheduled for execution at the SIMD processor 502. Because all of the memory required by the workgroup is allocated in advance, the last task 513 receives slice 519 of the block. Since all of the tasks receive their required memory allocations, processing of all of the tasks can proceed to the barrier synchronisation point 520. Once all of the tasks have been processed to the barrier 520, processing of all of the tasks may be permitted to continue to completion and hence the workgroup as a whole can be processed to completion. Because of the approach of allocating contiguous space to a whole block, the shared memory is more robust to fragmentation, with contiguous space being more likely to be available in the shared memory for allocation to new blocks.

If sufficient contiguous space is not available for the whole block 514, the memory request in respect of the first tasks of workgroup A is rejected. The rejected memory request may be handled in any number of ways but would typically wait to be serviced the next time the resource allocator looks to service the respective requestor according to its defined scheme (e.g. on a round-robin basis or according to a set of rules for arbitrating between the requestors). Subsequent memory allocation requests may be successful once sufficient memory becomes available (e.g. through tasks completing at other processing units and the corresponding memory portions being released).

The resource allocator may maintain a data structure 206 identifying which workgroups have already been allocated a block of memory. For example, on reserving a block of memory for a workgroup, the resource allocator may add an entry to the data structure associating the memory block with that workgroup so that when tasks of that workgroup are subsequently received the resource allocator can identify from which block a slice of memory is to be allocated. Similarly, the resource allocator can use the data structure 206 to identify which tasks do not belong to a workgroup for which a block of memory has already been allocated, and therefore for which a new block allocation is to be performed. The data structure 206 could have any suitable configuration—for example, it may be a simple lookup table or register.

In order to allocate slices of a reserved block to subsequently-received tasks of a workgroup, the resource allocator needs to know which memory requests it receives belong to which workgroup. A memory request may comprise an identifier of the workgroup the respective task belongs to so as to allow the resource allocator to identify memory requests belonging to workgroups for which a block has been reserved. Alternatively, the resource allocator may have access to a data store (e.g. a lookup table held at the work scheduler 302) which identifies which tasks belong to which workgroups. Typically a memory request will identify the task in respect of which a memory request is being made and such a task identifier could be used to look up the corresponding workgroup in the data store.

Memory requests received in respect of workgroups for which a memory block has already been allocated can be preferentially prioritised. This can help to minimise latency in the system by ensuring that, once memory has been allocated to a workgroup and the resources are reserved in the system for processing that workgroup to completion, all the tasks of the workgroup are able to commence processing as soon as possible and reach any defined barrier synchronisation point for the workgroup. In other words, ensuring that memory is allocated to tasks as soon as possible after it has been reserved as a block for a workgroup can help to avoid tasks which are later allocated their memory slice from delaying the processing of other tasks in a workgroup which have already been allocated their slice and are ready to begin processing.

Any suitable mechanism for prioritising memory requests may be implemented. For example, the resource allocator could be configured to preferentially service requests from the same requestor 205 from which the initial request which led to the block being allocated was received. A requestor could be preferred by increasing the frequency at which its memory requests are serviced relative to other requestors. A requestor could be preferred by, following allocation of a block, repeatedly servicing memory requests received from that same requestor until a memory request is received in respect of a task belonging to a different workgroup. The resource allocator may use the data structure 206 described above to identify which memory requests correspond to workgroups for which a memory block has already been reserved, and hence which memory requests should be prioritised.

Note that in some implementations of the system described herein, some tasks in respect of which memory requests are received by the resource allocator will not belong to a workgroup. For example, one or more of the processing units 301 in FIG. 3 for processing tasks may not be a SIMD processor. The resource allocator may be configured to identify tasks that do not belong to a workgroup from one or more identifiers, or a lack of one or more identifiers—e.g. no workgroup identifier, in the memory requests it receives. Alternatively or additionally, the resource allocator may determine whether a received memory request is made in respect of a task that does not belong to a workgroup by looking up an identifier received in the memory request in a data store (e.g. a lookup table held at the work scheduler 302) identifying which tasks belong to which workgroups.

An approach to allocating memory portions at the resource allocator 201 will now be described.

The resource allocator may be configured to further partition the shared memory 202 into a plurality of non-overlapping windows, each comprising a plurality of memory portions. The length of each window may be a power of two so as to enable efficient implementation of the resource allocator at a binary logic circuit. The windows may all be of the same length. A fine status array 207 is maintained by the resource allocator indicating which memory portions are allocated and which are not allocated—for example, the fine status array may comprise a one-dimensional array of bits in which each bit corresponds to one memory portion of the shared memory and the value of each bit indicates whether the respective memory portion is allocated or not (e.g. a '1' indicates a portion is allocated; a '0' indicates it is not). The size of each window may be selected such that the resource allocator is able to search the window for non-allocated memory portions sufficient to contain a given size of contiguous block in a single clock cycle of the digital hardware at which the resource allocator is embodied. Typically the size of the shared memory 202 will be too large for the resource allocator to search the entire memory space in one clock cycle.

The resource allocator may maintain a window pointer 208 (e.g. a register internal to the resource allocator) which identifies in which window of the shared memory the resource allocator is to start a new memory allocation on receiving a first memory request in respect of a workgroup that has yet to be allocated memory. On receiving a memory request in respect of a first task of a workgroup, the resource allocator checks the current window for a position in which the contiguous block of memory to be reserved for the workgroup can fit. This will be termed a "fine check". The resource allocator identifies unallocated memory portions using the fine status array 207. The resource allocator may start at the lowest address of the current window and scan in the direction of increasing memory address so as to identify the lowest possible starting position for the block and minimise fragmentation of the shared memory. Any suitable algorithm for identifying a contiguous set of memory portions which can accommodate the block of memory may be used.

When a block is allocated to a workgroup, the fine status array is updated so as to mark the all the respective memory portions of the block as allocated. In this manner the block is reserved for use by the tasks of the workgroup.

The resource allocator may further maintain a coarse status array 209 which indicates whether each window of the shared memory is entirely unallocated—in other words, whether all of the memory portions of a window are unallocated. The coarse status array could be a one-dimensional array of bits in which each bit corresponds to one window of the shared memory and the value of each bit indicates whether the respective window is entirely unallocated or not. The bit value of a window in the coarse status array could be calculated as an OR reduction of all of the bits of the status array which correspond to memory portions lying in that window.

The resource allocator may be configured to perform a coarse check in conjunction with the fine check. The coarse check comprises identifying from the coarse status array 209 whether or not the next one or more windows after the current window indicated by the window pointer 208 can accommodate the new block of memory required for the workgroup—i.e. if the coarse status array 209 indicates that the next window is completely unallocated then all of those memory portions are available for use by the block. One or more windows following the current window may be checked since in some systems it might be possible for a required block to exceed the size of a window.

The resource allocator may be configured to allocate a block of shared memory to a workgroup using the fine and coarse checks as follows:

1. If the fine check of a block of memory for allocation to a workgroup is successful and the block can be accommodated in the current window, the block is reserved for use by that workgroup (e.g. by marking the respective memory portions as allocated in the fine status array and adding the workgroup to data structure 206) and a slice of the block (e.g. the first slice) is allocated to the task in respect of which the memory request was made. If a coarse check of memory indicated that the current window of the shared memory was entirely unallocated then the coarse status array could be updated to indicate that the current window is now no longer entirely unallocated.
2. If the fine check of a block of memory for allocation to a workgroup was not successful but the coarse check of memory is successful and the block can be accommodated by one or more unallocated windows following the current window, the block is reserved for use by the workgroup. The block may be allocated starting at the first unallocated memory portion which forms a contiguous region of unallocated memory portions with the following window. The allocated block extends into the one or more following windows identified as being available by the coarse check.

If both the fine and coarse checks fail, the memory request could be deferred and subsequently attempted again (perhaps on the next clock cycle or after a predetermined number of clock cycles have passed). The resource allocator could attempt to service other memory requests prior to returning to the failed memory request (e.g. the resource allocator could move on to service a memory request from the next requestor according to some defined rules for arbitrating between the requestors).

Figure 6:
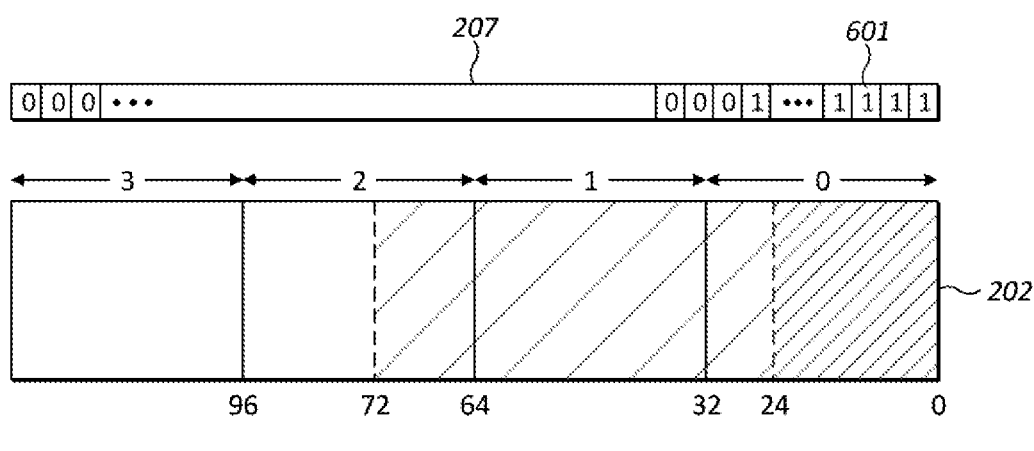
FIG. 6 illustrates allocation of shared memory by the resource allocator configured according to a particular embodiment described herein.

An exemplary allocation according to the above approach is illustrated in FIG. 6 in which the shared memory is partitioned into 128 memory portions and 4 windows each of 32 memory portions. The '1' bits 601 in the fine status array 207 indicate that the first 24 memory portions are allocated to workgroups but all of the higher memory portions are unallocated. The coarse status array thus indicates that only the first window includes allocated memory portions (see the '1' bit 602 corresponding to the first window). In this example, a 48 memory portion block of memory 603 is required for a workgroup. The resource allocator may have determined that such a block is required on receiving a memory request for 3 memory portions in respect of a first task of the workgroup: knowing that the memory request has been received from a requestor which is a SIMD processor for processing workgroups of 16 tasks, the resource allocator determined that 48 memory portions are required for the workgroup as a whole.

Assume that the current window as indicated by the window pointer of the resource allocator is the first window '0' (this is likely because the first unallocated memory portion after the allocated memory portions is memory portion 24). The fine check of the current window would fail because there are not 48 memory portions remaining in the first window '0'. However, the coarse check would succeed because both the second and third windows are indicated as being completely unallocated by the coarse status array 209. Block 48 would therefore be allocated starting from memory portion 24 of the first window and up to memory portion 71 of the third window. The window pointer would be updated to identify the third window as the current window because the next available unallocated memory portion is number 72.

The resource allocator could be configured to, in parallel with the fine and coarse checks, calculate an overflow metric. The overflow metric is given by the number of unallocated memory portions at the top of the current window (i.e. adjacent to the following window) subtracted from the size of the memory block required by the workgroup so as to give a measure of the number of memory portions that would overflow the current window if the block was allocated starting at the lowest memory portion of the contiguous block of unallocated memory at the top of the current window.

The resource allocator may be configured to use the overflow metric in an additional step after steps 1 and 2 above in order to attempt to allocate a block of memory to a workflow:

3. If the fine and coarse checks failed but there are some free memory portions at the top of the current window, a new attempt is made to allocate the block at the next opportunity (e.g. the next clock cycle) using the overflow metric as the requested size and starting at the lowest address of the following window of the shared memory. Both the fine and coarse checks may be performed as described for the initial allocation attempt. This additional allocation attempt is advantageous because although a coarse check failed on the following window, enough of the lower region of the following window may be available to, along with the free memory portions at the top of the current window, provide enough contiguous unallocated memory space to receive the block.

If step 3 fails, the memory request may be deferred and subsequently attempted again as described above.

Once an allocation is successful, the resource allocator updates the window pointer to the window that contains the memory portion immediately after the end of the successfully allocated block of memory portions (this may be the current window or a following window).

The use of the fine and coarse checks performed in parallel, optionally in combination with the use of the overflow metric also performed in parallel with the fine and coarse checks, enable the resource allocator to efficiently attempt to allocate shared memory to a workgroup in a minimum number of clock cycles. On suitable hardware, the above approach can enable block allocation to be performed in two clock cycles (a first in which the fine and coarse checks are performed and optionally the overflow metric is calculated, and a second in which the allocation is attempted according to steps 1-2 and optionally 3 above).

Figure 9:
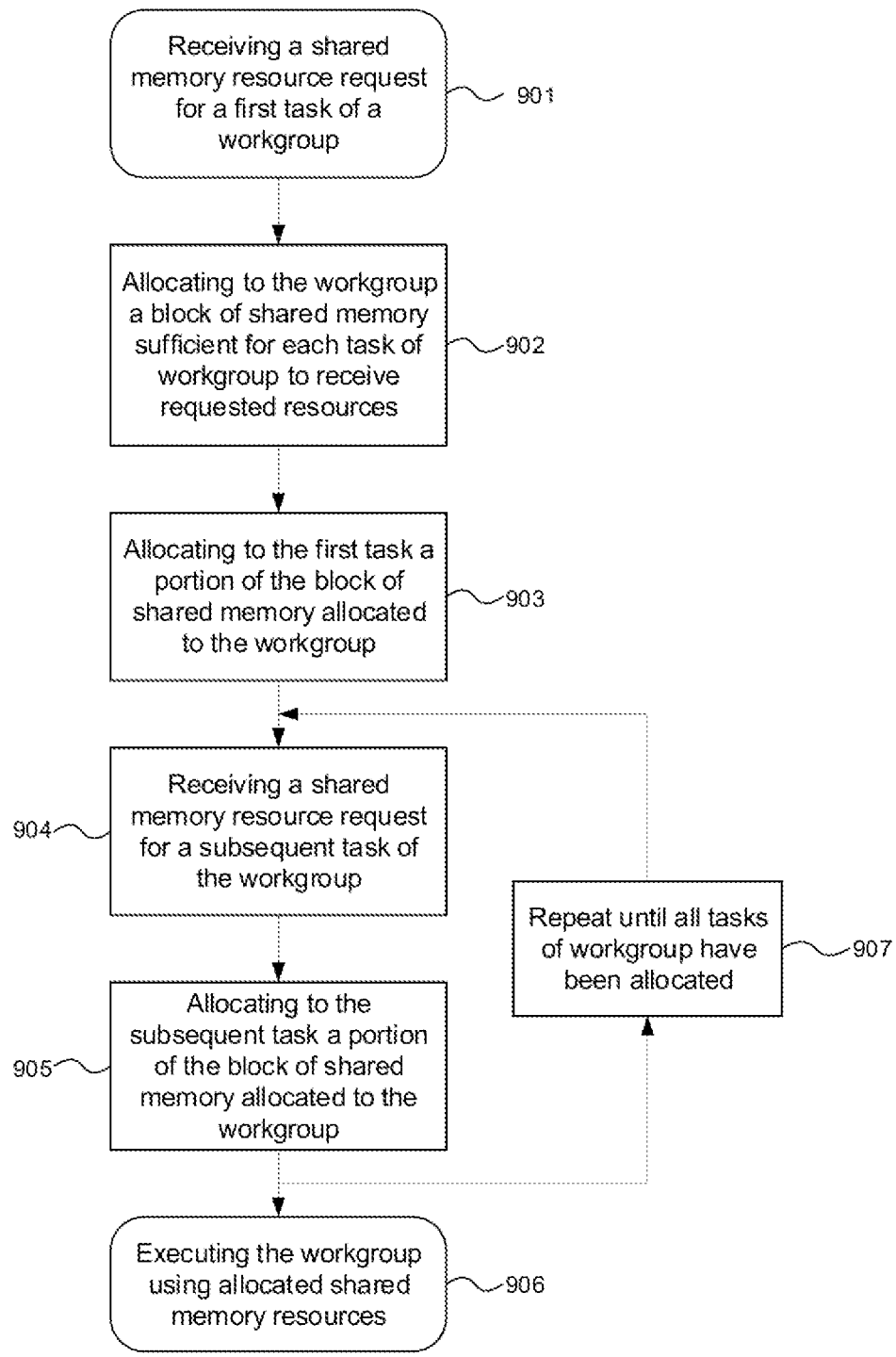
FIG. 9 is a flowchart illustrating the operation of the first memory subsystem configured according to principles described herein.

A flowchart illustrating the allocation of shared memory by the resource allocator is shown in FIG. 9. The resource allocator receives a request for shared memory resources 901 in respect of a first task of a workgroup—i.e. the first task from amongst the tasks of the workgroup for which a request for shared memory has been received. In response, the workgroup is allocated a block of shared memory which is sufficient in size to provide all of the tasks of the workgroup with the resources requested by the first task. Typically the block will be a contiguous block of shared memory. The first task is allocated a portion of the block of shared memory 903—this step may or may not be considered part of the allocation of memory to the workgroup 902 and may be performed before, concurrently with, or after the allocation of memory resources to the workgroup. In some implementations the remaining part of the shared memory may be reserved for the other tasks of the workgroup.

When a subsequent request for shared memory is received for another task of the same workgroup 904, that task is allocated 905 a portion of the block of shared memory allocated to the workgroup. In some implementations the allocation of shared memory may be performed for all tasks in response to receiving the first memory request 901 from the tasks of the workgroup. In such implementations further allocation may comprise responding with the allocation of memory resources to tasks established in response to the first-received memory request in respect of the workgroup.

The allocation of memory resources from the block is repeated 907 until all the tasks of the workgroup have received the required memory resources. Execution of the workgroup may then be performed 906, with each task using its allocated shared memory resources of the block allocated to the workgroup.

Fragmentation Insensitive

A second configuration of a memory subsystem will now be described which also addresses the above-described limitations of prior art systems for allocating shared memory.

Figure 7:
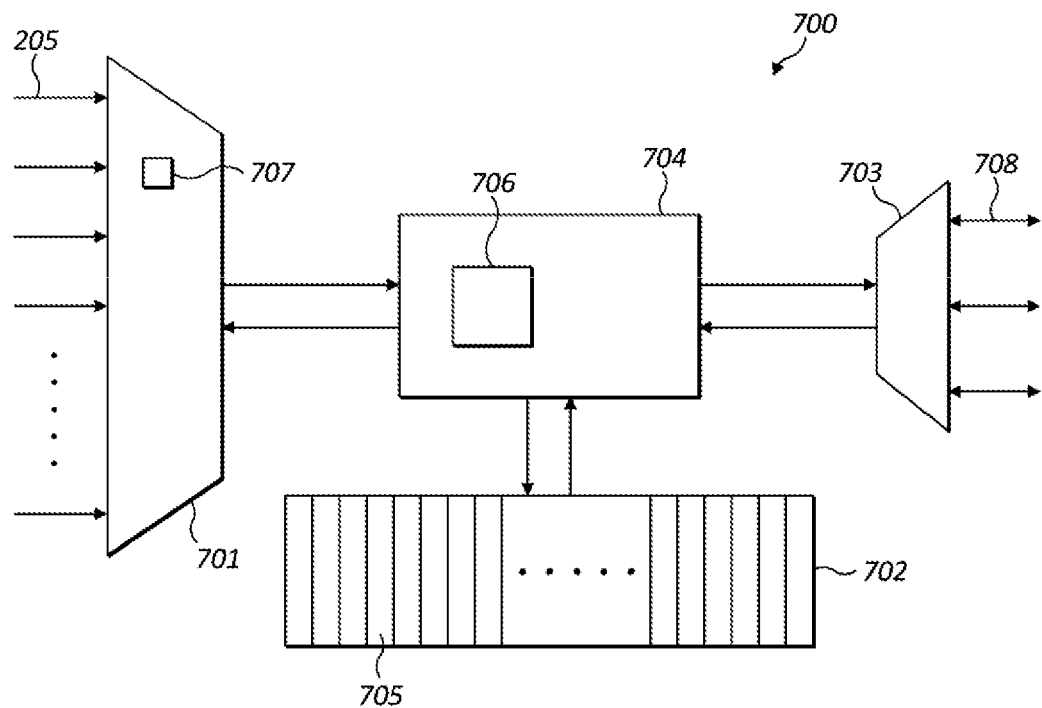
FIG. 7 is a schematic diagram of a second memory subsystem comprising a resource allocator configured according to principles described herein.

FIG. 7 shows a memory subsystem 700 comprising a resource allocator 701, a shared memory 702, an input/output arbiter 703 and a translation unit 704. The shared memory is partitioned into a plurality of memory portions 705. The resource allocator may be configured to receive memory requests from a plurality of requestors 205—for example, each task running at a processing unit may be a requestor, each processing unit may be a requestor, or each type of processing unit may be a requestor. Different requestors may have different hard-wired inputs to the resource allocator which the resource allocator is required to arbitrate between.

The resource allocator may service memory requests from requestors on any suitable basis—for example, memory requests could be serviced on a simple round-robin basis or according to a set of arbitration rules for selecting the next requestor to be serviced. In other embodiments, memory requests from multiple requestors may be aggregated at a request queue into which memory allocation requests are received and from which the resource allocator may receive memory requests to service. Allocation portions of the shared memory may be accessed by the processing units by means of input/output arbiter 703.

The memory subsystem 700 may be arranged in a computer system in the manner shown in FIG. 3 and described above.

In the present configuration, the resource allocator is configured to allocate shared memory 702 to tasks using the translation unit 704, and input/output arbiter 703 is configured to access shared memory 702 by means of the translation unit 704. The translation unit 704 is configured to associate each task in respect of which a memory request is received with a plurality of memory portions 705 of the shared memory. Each task would typically have an identifier which is provided in a memory request made in respect of that task. The plurality of memory portions associated with a task do not need to be contiguous in the shared memory. However, from the point of view of the task, the task will receive an allocation of a contiguous block of memory. This is achieved by the resource allocator being configured to allocate to a task a contiguous virtual block of memory when that same task is in fact associated at the translation unit with a potentially non-contiguous set of memory portions.

On a task accessing an area of memory allocated to it (e.g. by means of a read or write operation), the translation unit 704 is configured to translate between the logical address provided by the task and the physical address at which its data is held or to be written to. Note that the virtual addresses provided to tasks by the resource allocator need not belong to a consistent virtual address space, and in some examples the virtual addresses will correspond to physical addresses at the shared memory. It can be advantageous for the logical addresses used by tasks to be offsets relative to some base address (which itself may be an offset of zero or some other predefined value) of a predetermined position in a virtual block (typically the start of the block). Since a virtual block is contiguous, only the relative position of data within its block to which access is required needs to be provided to the translation unit. The particular set of memory portions in shared memory which make up a virtual block of a task are determined by the translation unit from the association in the data store 706 of the task identifier with those memory portions.

In response to receiving a request for memory resources, the resource allocator is configured to allocate to the task a set of memory portions sufficient to satisfy the request. The memory portions need not be contiguous or stored in sequence in the shared memory. The resource allocator is configured to cause the translation unit to associate the task with each of the memory portions of the set. The resource allocator may keep track of unallocated memory portions at the shared memory by means of a data structure 707 indicating which memory portions are available. For example, the data structure could be a status array (such as the fine status array above) whose bits identify whether each memory portion at the shared memory is allocated or not.

The translation unit may comprise a data store 706 and be configured to associate a task with a set of memory portions by storing against the physical address of each of the memory portions of the set an identifier of the task (e.g. a task_id) in the data store and an indication of which region of the contiguous virtual memory block each memory portion allocated to the task corresponds (e.g. the offset of the region in the virtual memory block or a logical address of the region). In this manner, the translation unit can return the appropriate physical address to a task in response to the task providing its identifier and an indication as to which region of its virtual memory block it requires (e.g. an offset within its virtual block). An offset could be a number of memory portions (e.g. where a memory portion is the basic allocation interval), a number of bits or bytes, or any other indication of location of a memory area relative to a base address. A base address may be but need not be a memory address at which a virtual memory block starts; a base address could be an offset of zero. The data store could be an associative memory, such as a content addressable memory, whose inputs could be the task identifier and an indication of the required region of memory within its block (e.g. a memory offset from a base address of its block).

More generally the translation unit could be provided at any suitable point along the data path between the resource allocator 701 and the shared memory 702, and between the I/O arbiter 703 and the shared memory 702. More than one translator unit may be provided. Multiple translator units may share a common data store such as a content addressable memory.

The resource allocator may be configured to allocate logical base addresses to different tasks of a workgroup so as to identify to each task of the workgroup a contiguous virtual memory block which lies within a contiguous virtual superblock of memory for the workgroup as a whole.

Figure 8:
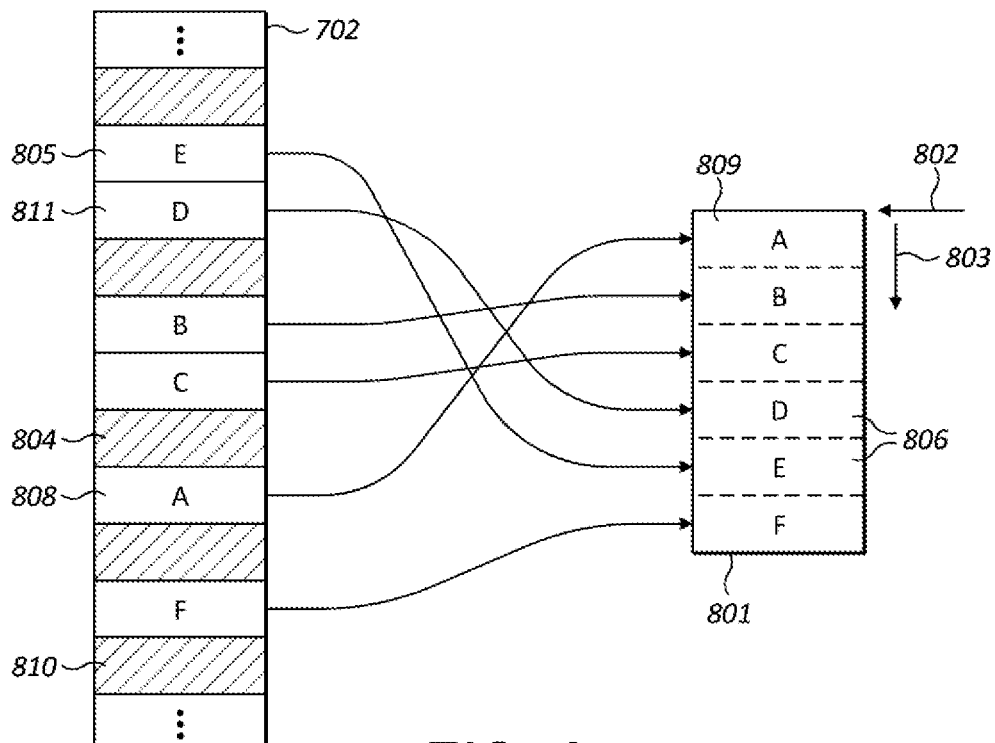
FIG. 8 illustrates the correspondence between a virtual memory block and its underlying memory portions of a shared memory.

FIG. 8 illustrates the correspondence between memory portions 805 of shared memory 702 which are allocated to a task and a virtual block 801 allocated to a task. Memory portions 805 marked A-F of the shared memory provide the underlying storage for the regions 806 of virtual contiguous memory block 801. The memory blocks A-F are not contiguous or stored in sequence in the shared memory and are located amongst memory portions 804 allocated to other tasks. The virtual block 801 has a base address 802 and regions of the block can be identified by their offset 803 in the block relative to the base address.

In one example, in response to receiving a request for memory resources, the resource allocator is configured to allocate to the task a contiguous range of memory addresses starting at the physical address of the memory portion corresponding to the first region of the block—in other words, the base address 802 of the virtual block (and of region 'A' or 809 in FIG. 8) is the physical address of the memory portion 'A' or 808 in FIG. 8. Assuming sufficient unallocated memory portions exist in the shared memory to service the memory request, the resource allocator allocates to the task a virtual memory block of the requested size starting at the physical memory address of memory region 809. From the task's point of view it is therefore allocated a contiguous block of six memory portions in the shared memory starting at memory portion 808; in fact, the task is allocated the six non-contiguous memory portions marked A, B, C, D, E, and F in shared memory 702. Thus, the actual allocation of memory portions to a task is masked by the virtual block 801 it receives. In this example the virtual block has a physical address and there is no virtual address space as such.

Once a task has been allocated a virtual block of memory, it may access that memory by means of I/O arbiter 703 which typically arbitrates access to the shared memory between a plurality of units (e.g. processing units or other units which are able to access the shared memory) which submit access requests (e.g. reads/writes) over interface 708 (which may comprise one or more hardwired links between which the I/O arbiter arbitrates).

Continuing the above example, consider the case when the task requests access an area of its block 801 which lies in region D'. The task would submit a request to the I/O arbiter 703 which includes its task identifier (e.g. a task_id) and an indication of the area of its block it requires access to. That indication could be, for example, an offset 803 relative to the base address 802 (e.g. a number of bits, bytes or memory portions units), or a physical address formed based on the physical base address 802 allocated to the work and the offset 803 in the block at which the requested memory area is to be found. The translator unit would look up the work unit identifier and the desired offset/address in the data store 706 so as to identify the corresponding physical address identifying memory portion 811 in the shared memory 702. The translator unit would service the access request from memory portion 811 in the shared memory. Where a memory area in the block spans more than one memory region, the data store would return more than one physical address for the corresponding data portions.

In implementations in which the task provides a physical address for the memory area, the submitted physical address would in this case refer to an area of memory in memory portion 810, which is allocated to another task. Thus different tasks might ostensibly have access to overlapping blocks in the shared memory. But because each access request is translated by the translation unit 704, accesses to a physical address submitted by a task are redirected by the translator unit to the correct memory portion (in the present example, 811). In this case therefore, the logical addresses referencing a virtual memory block are in fact physical addresses but not necessarily the physical addresses at which the respective data of the block is held in the shared memory.

In a second example, in response to receiving a request for memory resources, the resource allocator is configured to allocate to the task a contiguous range of logical memory addresses starting at a base logical address and representing a virtual block of memory. Logical addresses could be allocated in any suitable manner since a given logical address will be mapped to the physical address of a corresponding underlying memory portion. For example, logical addresses may be allocated to tasks from a virtual address space consistent between tasks so that the virtual blocks allocated to different tasks do not share overlapping logical address ranges; a logical base address could be allocated to each task from a set of logical addresses with offsets relative to the base address being used to refer to positions within a virtual block; or a logical base address could be allocated as an offset of zero.

Translation unit is responsive to access requests (e.g. reads/writes) received from tasks via I/O arbiter 703. Each access request may include an identifier of the task and an offset or logical address identifying the area of its virtual block to which access is required. On receiving an access request from a task via I/O arbiter 703, the translation unit is configured to identify the required physical address in the data structure based on the identifier of the work unit and the offset/logical address. The offset/logical address is used to identify which of the memory portions associated with a task is to be accessed.

As an example, consider again the case above in which a task requires access to an area of memory in region D' of its virtual block 801 as shown in FIG. 8. The translation unit would receive an access request from the task comprising an identifier of the task and an offset 803 pointing to a location in region D'. Using the identifier of the task and the offset, the translation units looks up in the data store 706 the physical address of the corresponding memory portion 811 in the shared memory (i.e. the physical address associated in the data store with that task and offset). The translation unit could then proceed to service the access request at the corresponding memory portion 811 (e.g. by performing the requested read from/write to memory portion 811).

It will be appreciated that the "fragmentation insensitive" approach described herein allows an underlying shared memory 702 to become fragmented whilst tasks themselves receive contiguous blocks of memory. Provided that a sufficient number of memory portions are available at a shared memory, this enables blocks of memory to be allocated to tasks and workgroups comprising a plurality of tasks even when there is insufficient contiguous space in the shared memory to allocate contiguous blocks of memory portions of the required size.

Figure 10:
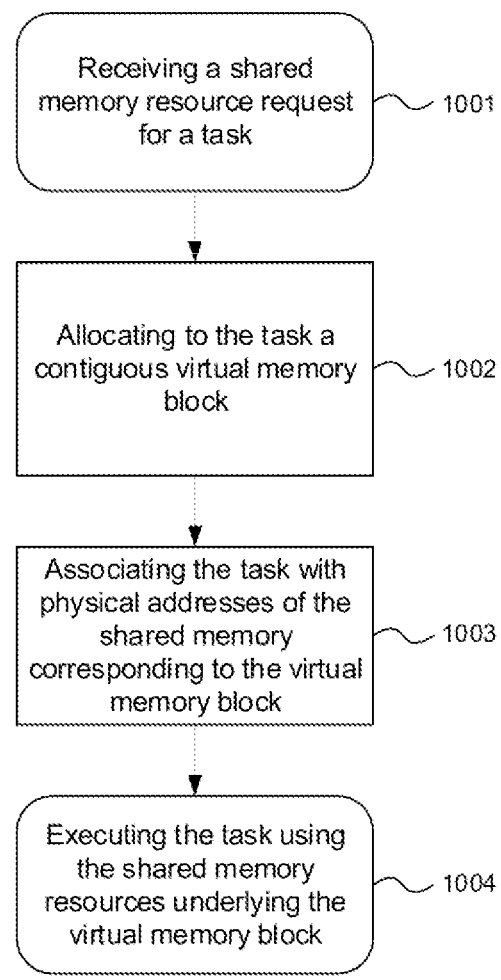
FIG. 10 is a flowchart illustrating the operation of the second memory subsystem configured according to principles described herein.

A flowchart illustrating the allocation of memory resources to tasks by the resource allocator is shown in FIG. 10. On receiving a request for shared memory resources 1001 in respect of a task, the task is allocated a contiguous block of virtual memory 1002. The virtual memory block is associated 1003 with physical memory addresses of the shared memory such that each portion of the virtual block corresponds to an underlying portion of physical shared memory. Once the task has received its allocated virtual memory, the task may be executed 1004 at the SIMD processor, with the task using the underlying shared memory resources at the physical address(es) corresponding to its allocated virtual memory block. The memory subsystems of FIGS. 2, 3 and 7 are shown as comprising a number of functional blocks. This is schematic only and is not intended to define a strict division between different logic elements of such entities. Each functional block may be provided in any suitable manner. It is to be understood that intermediate values described herein as being formed by each functional block need not be physically generated by the functional block at any point and may merely represent logical values which conveniently describe the processing performed by the functional block between its input and output.

The memory subsystems described herein may be embodied in hardware on an integrated circuit. The memory subsystems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors. It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a memory subsystem configured to perform any of the methods described herein, or to manufacture a memory subsystem comprising any apparatus described herein. An integrated circuit definition dataset may be, for example, an integrated circuit description.

There may be provided a method of manufacturing, at an integrated circuit manufacturing system, a memory subsystem as described herein. There may be provided an integrated circuit definition dataset that, when processed in an integrated circuit manufacturing system, causes the method of manufacturing a memory subsystem to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a memory subsystem will now be described with respect to FIG. 11.

Figure 11:
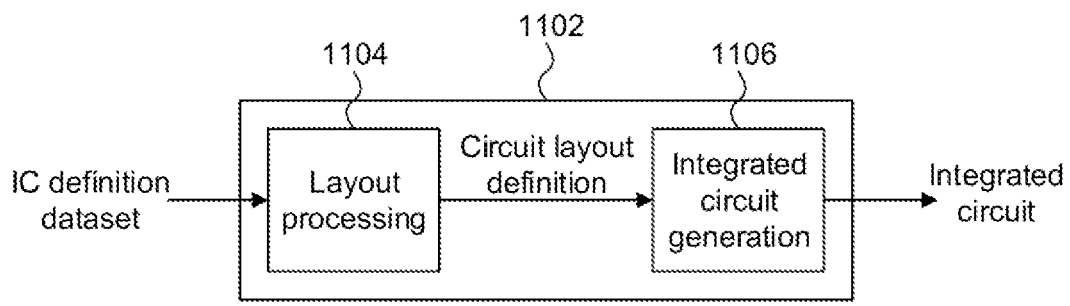
FIG. 11 is a schematic diagram of an integrated circuit manufacturing system.

FIG. 11 shows an example of an integrated circuit (IC) manufacturing system 1102 which is configured to manufacture a memory subsystem as described in any of the examples herein. In particular, the IC manufacturing system 1102 comprises a layout processing system 1104 and an integrated circuit generation system 1106. The IC manufacturing system 1102 is configured to receive an IC definition dataset (e.g. defining a memory subsystem as described in any of the examples herein), process the IC definition dataset, and generate an IC according to the IC definition dataset (e.g. which embodies a memory subsystem as described in any of the examples herein). The processing of the IC definition dataset configures the IC manufacturing system 1102 to manufacture an integrated circuit embodying a memory subsystem as described in any of the examples herein.

The layout processing system 1104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1104 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a memory subsystem without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A memory subsystem for use with a single-instruction multiple-data (SIMD) processor comprising a plurality of processing units for processing SIMD tasks, the memory subsystem comprising:
   a shared memory partitioned into a plurality of memory portions for allocation to tasks that are to be processed by the processor;
   a translation unit configured to associate tasks with one or more physical addresses of the shared memory; and
   a resource allocator configured to, in response to receiving a memory resource request for first memory resources in respect of a task, allocate to the task a contiguous virtual memory block and cause the translation unit to associate the task with a plurality of physical addresses of memory portions each corresponding to a region of the contiguous virtual memory block, said memory portions collectively embodying the complete contiguous virtual memory block, wherein the contiguous virtual memory block comprises a base address which is the physical address of one of the memory portions associated with the task.

2. The memory subsystem according to claim 1, wherein at least some of the plurality of memory portions of the contiguous virtual memory block are not contiguous in the shared memory.

3. The memory subsystem according to claim 1, wherein the translation unit is operable to subsequently service an access request received from the task in respect of the contiguous virtual memory block, the access request including an identifier of the task and an offset of an area of memory within the contiguous virtual memory block, the translation unit being configured to service the access request at the memory portion corresponding to the region of the contiguous virtual memory block indicated by the offset.

4. The memory subsystem according to claim 1, wherein the translation unit comprises a content addressable memory configured to return one or more corresponding physical addresses in response to receiving an identifier of the item and an offset within the contiguous virtual memory block.

5. The memory subsystem according to claim 1, wherein the SIMD processor is configured for processing one or more workgroups, each workgroup comprising a plurality of SIMD tasks, the task is the first-received task of a workgroup, and the resource allocator is configured to reserve for the workgroup sufficient memory portions for each task of the workgroup to receive memory resources equivalent to the first memory resources and to allocate to the first-received task the requested memory resources from the memory portions reserved for the workgroup.

6. The memory subsystem according to claim 5, wherein the resource allocator is configured to allocate each task of the workgroup a contiguous virtual memory block such that the contiguous virtual memory blocks allocated to the tasks of the workgroup collectively represent a contiguous superblock of virtual memory blocks.

7. The memory subsystem according to claim 6, wherein the resource allocator is configured to, in response to subsequently receiving a memory resource request in respect of a second task of the workgroup, allocate a contiguous virtual memory block from the contiguous superblock of virtual memory blocks to the second task.

8. The memory subsystem according to claim 5, wherein the resource allocator may maintain a data structure identifying which of the one or more workgroups are currently allocated a contiguous virtual memory block.

9. The memory subsystem according to claim 8, wherein the data structure comprises a fine status array arranged to indicate whether each memory portion of the shared memory is allocated to the task.

10. A method of allocating shared memory resources to tasks for execution in a single-instruction multiple-data (SIMD) processor comprising a plurality of processing units each configured for processing SIMD tasks, the method comprising:
receiving a memory resource request for first memory resources in respect of a task;
allocating to the task a contiguous virtual memory block; and
associating the task with a plurality of physical addresses of memory portions of a shared memory, each corresponding to a region of the contiguous virtual memory block, said memory portions collectively embodying the complete contiguous virtual memory block, wherein the contiguous virtual memory block comprises a base address which is the physical address of one of the memory portions associated with the task.

11. The method according to claim 10, wherein at least some of the plurality of memory portions of the contiguous virtual memory block are not contiguous in the shared memory.

12. The method according to claim 10, further comprising:
subsequently receiving an access request received from the task in respect of the contiguous virtual memory block, the access request including an identifier of the task and an offset of an area of memory within the contiguous virtual memory block; and
servicing the access request by accessing the memory portion corresponding to the region of the contiguous virtual memory block indicated by the offset.

13. The method according to claim 10, wherein tasks are grouped together in workgroups for execution at the SIMD processor, the task is the first-received task of a workgroup, and the allocating to the task a contiguous virtual memory block comprises:
reserving for the workgroup sufficient memory portions for each task of the workgroup to receive memory resources equivalent to the first memory resources; and
allocating to the first-received task the requested memory resources from the memory portions reserved for the workgroup.

14. The method according to claim 13, wherein the reserving for the workgroup comprises reserving each task of the workgroup a contiguous virtual memory block such that the contiguous virtual memory blocks allocated to the tasks of the workgroup collectively represent a contiguous superblock of virtual memory blocks.

15. The method according to claim 14, further comprising, in response to subsequently receiving a memory resource request in respect of a second task of the workgroup, allocating a contiguous virtual memory block from the contiguous superblock of virtual memory blocks to the second task.

16. The method according to claim 10, further comprising maintaining a data structure identifying which of the one or more workgroups are currently allocated a contiguous virtual memory block.

17. The method according to claim 16, wherein the data structure comprises a fine status array arranged to indicate whether each memory portion of the shared memory is allocated to the task.

18. The memory subsystem according to claim 1, wherein the memory subsystem is embodied in hardware on an integrated circuit.

19. The method according to claim 10, further comprising returning one or more corresponding physical addresses in response to receiving an identifier of the item and an offset within the contiguous virtual memory block.

20. A non-transitory computer readable storage medium having stored thereon a computer readable dataset description of an integrated circuit that, when processed in an integrated circuit manufacturing system, causes the integrated circuit manufacturing system to manufacture a memory subsystem for use with a single-instruction multiple-data (SIMD) processor comprising a plurality of processing units for processing SIMD tasks, the memory subsystem comprising:
a shared memory partitioned into a plurality of memory portions for allocation to tasks that are to be processed by the processor;
a translation unit configured to associate tasks with one or more physical addresses of the shared memory; and
a resource allocator configured to, in response to receiving a memory resource request for first memory resources in respect of a task, allocate to the task a contiguous virtual memory block and cause the translation unit to associate the task with a plurality of physical addresses of memory portions each corresponding to a region of the contiguous virtual memory block, said memory portions collectively embodying the complete contiguous virtual memory block, wherein the contiguous virtual memory block comprises a base address which is the physical address of one of the memory portions associated with the task.

* * * * *